United States Patent [19]

Tuenge et al.

[11] Patent Number: 4,954,747
[45] Date of Patent: Sep. 4, 1990

[54] MULTI-COLORED THIN-FILM ELECTROLUMINESCENT DISPLAY WITH FILTER

[76] Inventors: Richard T. Tuenge, Rte. 2, Box 1018, Hillsboro, Oreg. 97123; James Kane, 32 Royal Oak Rd., Lawrenceville, N.J. 08648

[21] Appl. No.: 272,736

[22] Filed: Nov. 17, 1988

[51] Int. Cl.$^5$ .............................................. H01J 1/62
[52] U.S. Cl. ................................... 313/506; 313/509; 313/112
[58] Field of Search ............... 313/505, 506, 509, 463, 313/112, 466, 474, 500, 503; 350/311; 358/253; 340/781

[56] References Cited

U.S. PATENT DOCUMENTS

| | | | |
|---|---|---|---|
| Re. 30,015 | 5/1979 | Lipp | 313/470 |
| 3,886,394 | 5/1985 | Lipp | 313/470 |
| 3,946,371 | 3/1976 | Inazaki et al. | 340/173 PL |
| 4,307,320 | 12/1981 | Kotera et al. | 313/474 |
| 4,357,557 | 11/1982 | Inohara et al. | 313/509 |
| 4,392,077 | 7/1983 | Libman | 313/474 |
| 4,396,864 | 8/1983 | Suntola et al. | 313/506 |
| 4,600,274 | 7/1986 | Morozumi | 340/784 X |
| 4,719,385 | 1/1988 | Barrow et al. | 313/463 |

Primary Examiner—Donald J. Yusko
Assistant Examiner—Michael Horabik
Attorney, Agent, or Firm—Lisa & Lisa

[57] ABSTRACT

A display having a filter disposed on, or in, a portion of the substrate is described. The filter is generally a red filter such that light passing through the filter will produce a red colored light. The filter is comprised of cadmium sulfoselenide in a 62/38 composition ($CdS_{.62}Se_{.38}$). The light is generated by a phosphor element which will emit a compatible color light. Other light emitting phosphors, such as green and blue, are also utilized without a filter to provide a multi-colored display.

46 Claims, 6 Drawing Sheets

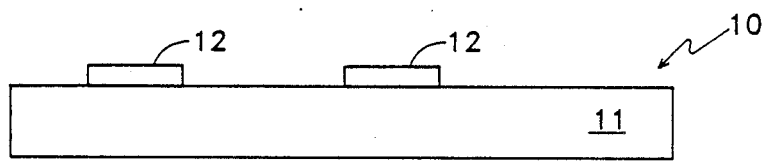
FIG. IA
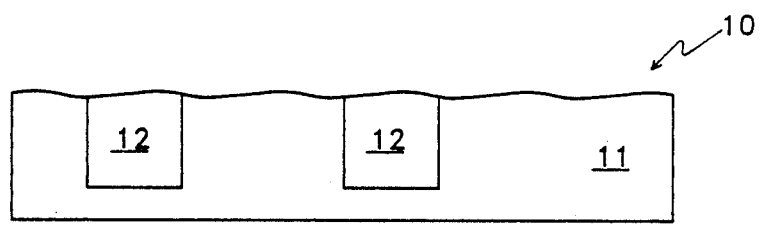
FIG. IB
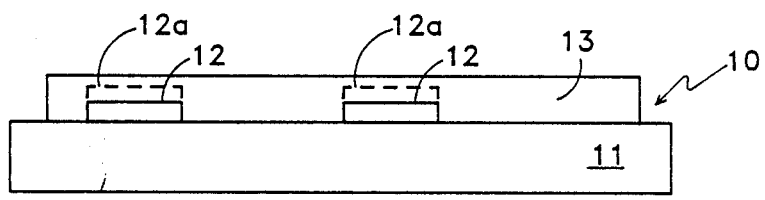
FIG. 2A
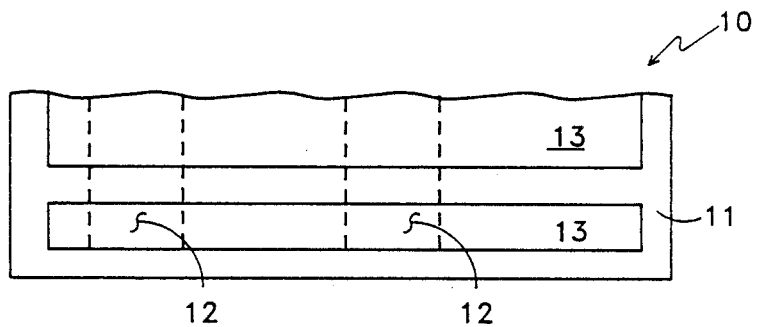
FIG. 2B

FIG. 10 Transmission spectrum of CdSSe thin film filter

MULTI-COLORED THIN-FILM ELECTROLUMINESCENT DISPLAY WITH FILTER

BACKGROUND OF THE INVENTION

The present invention relates, in general, to thin-film electroluminescent (TFEL) devices and, more particularly, to multi-colored TFEL devices.

Monochromatic TFEL devices, such as that depicted in Inazaki et al. Pat. No. 3,946,371, are known in the art. These devices typically comprise five layers: an electroluminescent phosphor layer, a pair of insulating layers, and a pair of electrodes. This composition is supported by a transparent substrate such as glass.

These TFEL devices, along with associated power supply, matrix addressing and logic circuitry, are utilized as flat screen display monitors for various applications, such as laptop computers.

Color TFEL devices, such as that depicted in Pat. No. 4,719,385 by Barrow et al., are also known in the art. This device uses a pair of subpanels with two different phosphors to provide displays of two colors and combinations of those colors. In the U.S. Pat. No. 4,719,385, a colored oil, such as red, is used to filter the light emission of one phosphor panel to provide a red color display.

A drawback of the previous color TFEL displays is the requirement that more than one subpanel be used. The use of multiple subpanels greatly increased the size and weight of the displays using these panels. Additional drawbacks to the use of multiple panels are that: more power is required to operate multiple panels than one panel; the brightness of the back subpanels is diminished by the forward subpanels through which its light must pass; and the cost is greater to fabricate multiple panels.

Accordingly, it is an object of the present invention to provide a multi-colored TFEL display which overcomes the above deficiencies.

A further object of the present invention is to provide a multi-colored TFEL display which is fabricated in a single panel.

Another object of the present invention is to provide a multi-colored TFEL display which provides improved brightness.

Still another object of the present invention is to provide a multi-colored TFEL display which is a lower power consuming display.

Yet another object of the present invention is to provide a multi-colored TFEL display which is more economical.

Another object of the present invention is to provide a multi-colored TFEL display with improved red color.

Still another object of the present invention is to provide a multi-colored TFEL display with an improved red color filter.

SUMMARY OF THE INVENTION

A preferred embodiment of the present invention comprises a TFEL device which has a plurality of phosphors disposed in the same plane of a panel. Between a glass substrate of the panel and a first insulator, a filter is formed below one type of the plurality of phosphors. Specifically, the plurality of phosphors comprise a blue phosphor, a green phosphor, and a yellow phosphor (ZnS:Mn). Between the yellow phosphor and the glass substrate is a red cadmium sulfoselenide (CdSSe) filter. One preferred composition is a 62/38 mixture of sulfur and selenium producing $Cds_{.62}Se_{.38}$.

BRIEF DESCRIPTION OF THE DRAWINGS

FIGS. 1A and 1B are cross-sectional and partial top planar views of the formation of the filter on a multi-color TFEL display embodying the present invention;

FIGS. 2A and 2B are cross-sectional and partial top planar views of the formation of a first set of electrodes on the multi-color TFEL display of FIGS. 1A and 1B;

DETAILED DESCRIPTION OF THE DRAWINGS

Figure 3A:
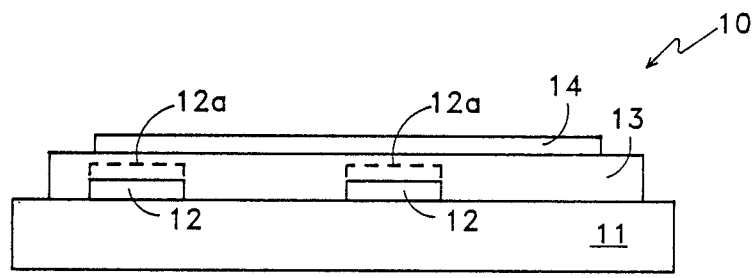
FIGS. 3A and 3B are cross-sectional and partial top planar views of the formation of a first insulating layer on the multi-color TFEL display of FIGS. 2A and 2B.

Referring to FIG. 1A a cross-sectional view of the formation of a multi-color TFEL display, generally designated 10, is illustrated. The formation of display 10 commences with a substrate 11, preferably glass.

On the surface of display 10 is deposited a layer of filter material 12. Filter material 12 is masked and etched leaving the rows illustrated in FIG. 1B. Filter 12 is used to provide a red colored light. Filter 12 is comprised of cadmium sulfoselenide ($CdS_xSe_{1-x}$) and may have a film thickness in the range of approximately 0.8 to 1.5 micrometers. By varying the composition of the sulfur and selenium, the chromaticity of the red color can be varied. By varying the range of x from 1 to 0 the energy band gap of filter 12 can be adjusted between 2.42 and 1.74 electron volts. A red emission is produced for compositions in the range of $0.8 < x < 0.4$. One preferable composition is a 70/30 composition ($CdS_{.70}Se_{.30}$) which provides a CIE chromaticity of $x = 0.650$ and $y = 0.345$.

Other inorganic thin films may also be used which have an energy band gap corresponding to the red region of the spectrum, such as zinc selenium telluride (ZnSeTe). A sharp absorption edge is desirable for good red chromaticity and high brightness.

A barrier layer 12a of aluminum oxide ($Al_2O_3$) or silicon nitride ($Si_3N_4$)) is next deposited on top of the filter to protect filter material 12 during etching of the electrode layer to form electrodes 13.

The next step is the formation of electrodes 13, FIGS. 2A and 2B. Electrodes 13 are formed by depositing a layer of electrode material, such as indium tin oxide (ITO) on the surface of substrate 11. The electrode material is then masked and etched forming electrodes 13 which extend perpendicular to filters 12.

Figure 3B:
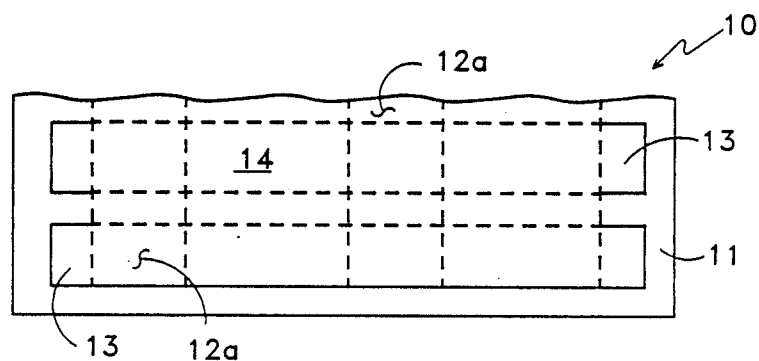

Following the formation of electrodes 13, an insulative layer 14 is deposited, FIGS. 3A and 3B. Insulator 14 will function to isolate the phosphor layer from electrodes 13. Since a high electric field is generated during operation, a material of a high dielectric figure of merit is desirable. Because of its productivity and low defect rate, silicon oxynitride (SiON) is generally used. However, improved materials, such as barium tantalate (Ba-$Ta_2O_6$), are also being used for insulating material.

Figure 4A:
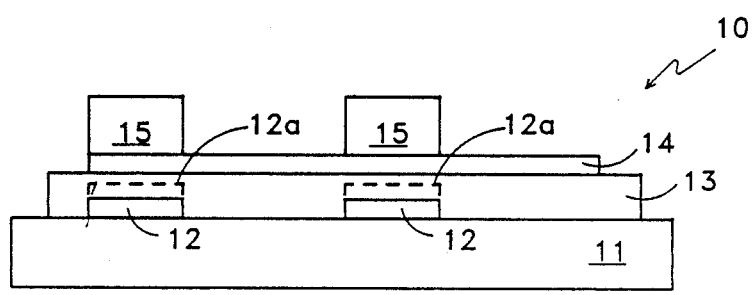
FIGS. 4A and 4B are cross-sectional and partial top planar views of the formation of a first phosphor on the multi-color TFEL display of FIGS. 3A and 3B.
Figure 4B:
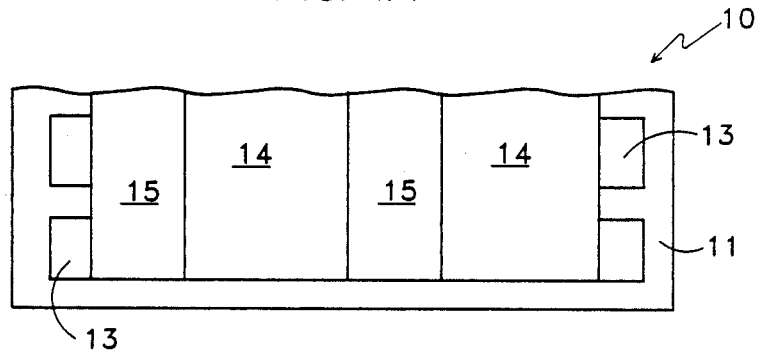

The first phosphor layer is formed by depositing a layer of phosphor, such as zinc sulfide doped with manganese (ZnS:Mn), on the surface of display 10. The first phosphor layer is then patterned and etched to form phosphor rows 15, FIGS. 4A and 4B. Phosphor rows 15 are formed in an overlying relation to filters 12. In forming the phosphor rows that are to be filtered first, the mask that is used for the formation of filters 12 can also be used for the formation of phosphor rows 15.

Figure 5:
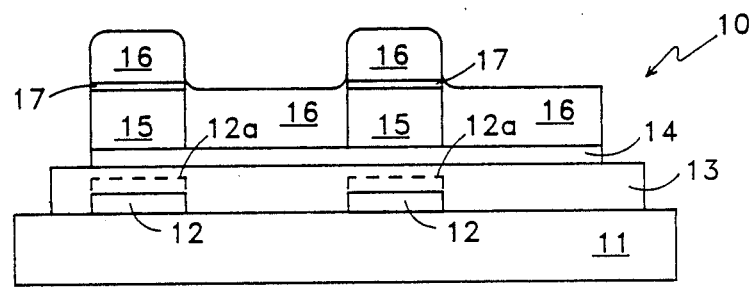
FIG. 5 is a cross-sectional view of the formation of a second phosphor on the multi-color TFEL display of FIGS. 4A and 4B.
Figure 6:
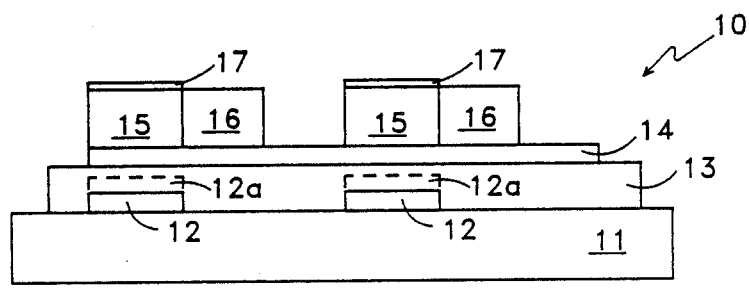
FIG. 6 is a cross-sectional view of the completed formation of the second phosphor on the multi-colored TFEL display of FIGS. 5.

Next, a second phosphor layer 16 is formed. Before depositing layer 16, an etch stop 17 is deposited on first phosphor 15. A second photomask is used to select the portion of layer 16 which is to be retained, FIG. 5. The remainder of phosphor layer 16 is etched. The etching will cease when etch stop 17 is reached above first phosphor layer 15 and when insulator 14 is reached in the unmasked area, FIG. 6. Phosphor layer 16 would, for example, be a green phosphor such as zinc sulfide doped with terbium fluoride (ZnS:$TbF_3$).

Figure 7A:
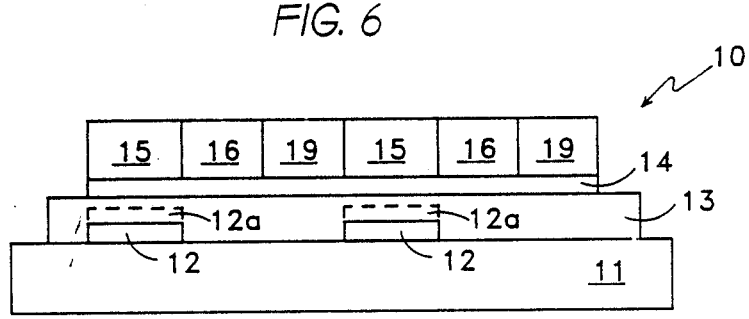
FIGS. 7A and 7B are cross-sectional and partial top planar views of the formation of a third phosphor on the multi-color TFEL display of FIG. 6.
Figure 7B:
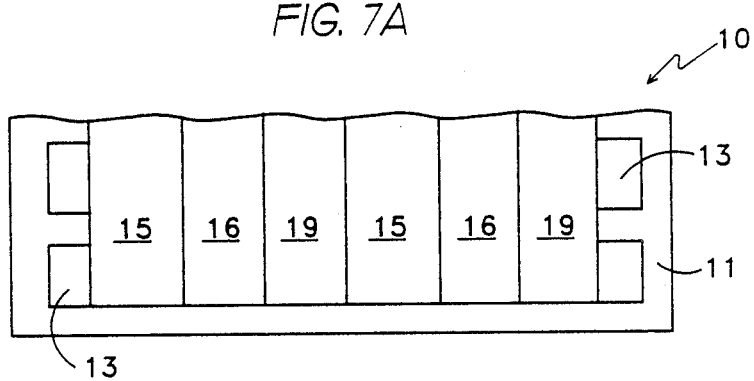

A third phosphor layer 19 is then deposited and etched in the same manner as second phosphor layer 16, FIGS. 7A and 7B. This third phosphor 19 would, for example, be a blue phosphor such as strontium sulphide doped with cerium fluoride (SrS:$CeF_3$) or zinc sulfide doped with thulium (ZnS:Tm).

Next, an insulating layer 20 is deposited on the surfaces of phosphors 15, 16, and 19. This insulating layer serves to isolate phosphors 15, 16, and 19 from top electrodes 21. Insulator 20 is generally comprised of the same material as insulator 14.

Figure 8:
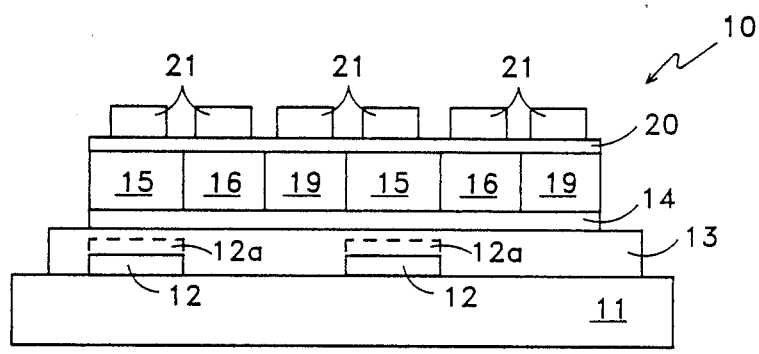
FIG. 8 is a cross-sectional view of the formation of a second set of electrodes on the multi-colored TFEL display of FIGS. 7A and 7B.

Electrodes 21 are formed on the surface of insulator 20 and run parallel to the underlying phosphors, FIG. 8. In this particular example, electrodes 21 are formed of reflecting aluminum. A reflecting material is used on the back side to reflect light which is transmitted toward the back of the display, and would otherwise be lost.

In operation, the appropriate electrodes are accessed to illuminate a particular phosphor to give the desired color. It should be noted that this process is not limited to multi-colored TFEL displays. In addition, it is not limited to three color multi-colored TFEL displays.

Figure 9:
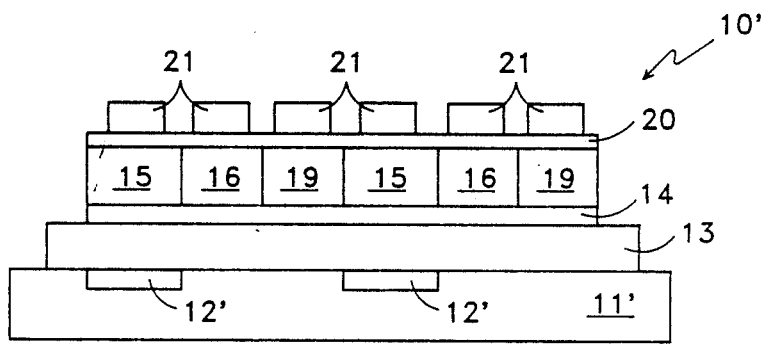
FIG. 9 is a cross-sectional view of a second embodiment of a multi-colored TFEL display embodying the present invention.

Referring to FIG. 9, an alternative embodiment of the present invention, device 10', is illustrated. Device 10' differs from device 10 in the formation of filter 12'. In device 10, filter 12 was deposited on the surface of substrate 11. In the alternative embodiment, filter 12' is deposited in substrate 11'. The formation of filter 12' may be accomplished either by diffusion of filter 12' into substrate 11'; or by etching a portion of substrate 11' and depositing filter 12' therein.

Figure 10:
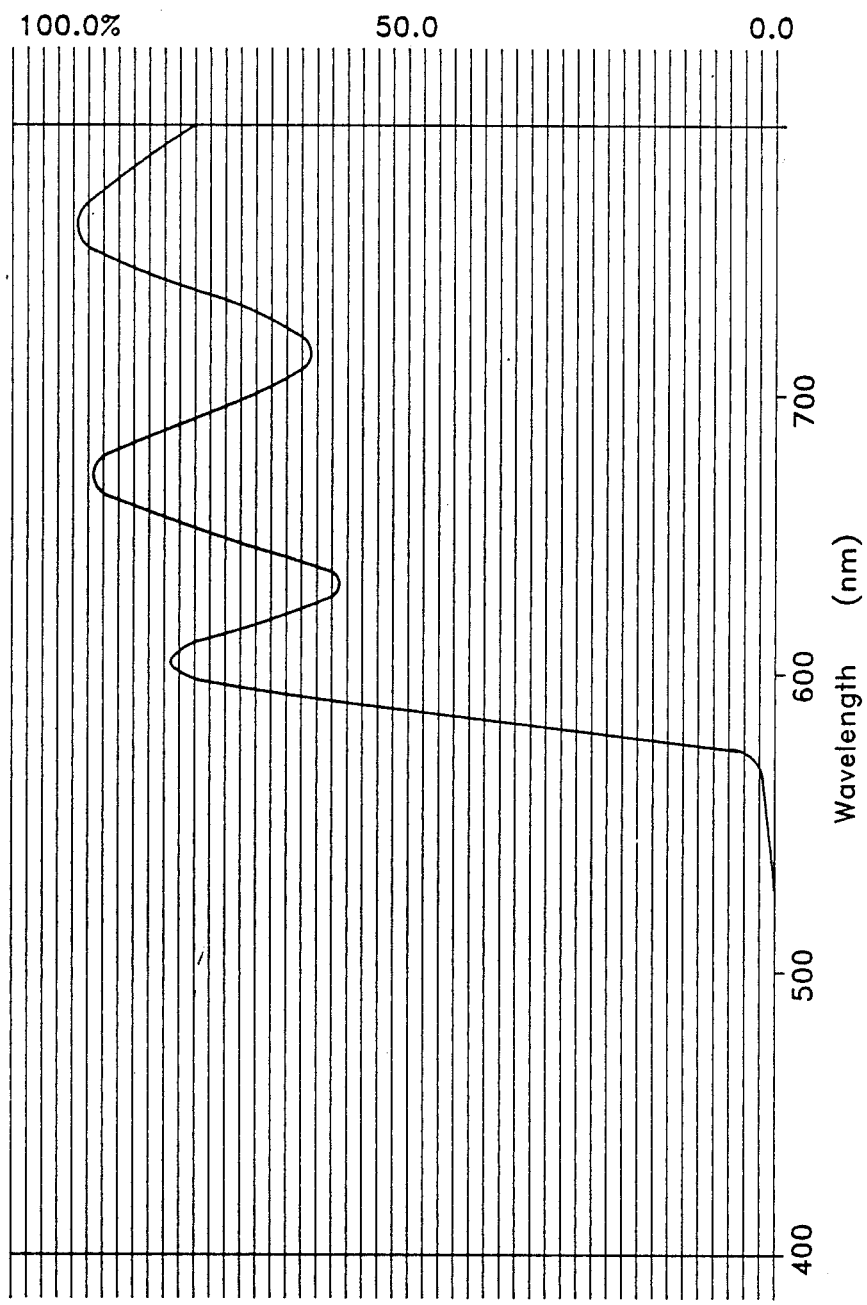
FIG. 10 is a transmission spectrum of the cadmium sulfoselenide thin film using a white light source.
Figure 11:
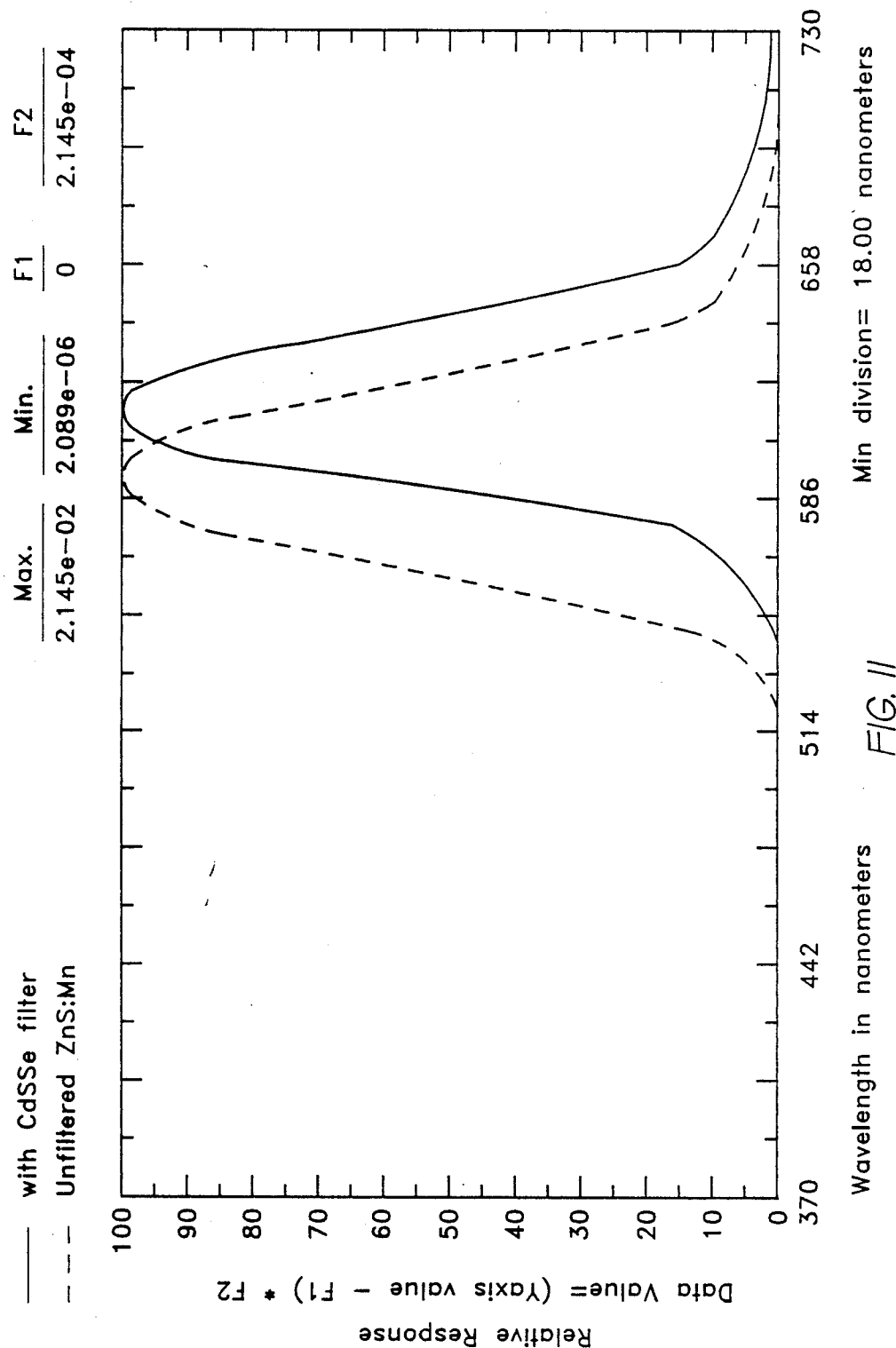
FIG. 11 is an emission spectrum of the ZnS:Mn phosphor measured through the $CdS_{0.7}Se_{0.3}$ filter compared with the unfiltered emission with the maximum intensity normalized to 100%.

With reference to FIG. 10, a transmission spectrum of a cadmium sulfoselenide (CdSSe) thin film is illustrated using a white light source. FIG. 11 is an emission spectrum of the ZnS:Mn phosphor measured through the $CdS_{0.7}Se_{0.3}$ filter compared with the unfiltered emission with maximum intensity normalized to 100%.

Thus, it will be apparent, upon reviewing this specification, to one skilled in the art that there has been provided in accordance with the invention, an apparatus and method that fully satisfies the objects, aims, and advantages set forth above.

While the invention has been described in conjunction with specific embodiments thereof, it is evident that many alterations, modifications, and variations will be apparent to those skilled in the art in light of the foregoing description. Accordingly, it is intended to embrace all such alterations, modifications, and variations in the appended claims.

We claim:

1. A multi-colored thin-film electroluminescent device comprising:
   a substrate;
   filter means for filtering light disposed on a first portion of a surface of said substrate;
   first electrode means for providing a first selecting potential to said device, said first electrode means being disposed on said surface of said substrate and also overlying said filter means;
   first insulator means for insulating said first electrode means, said first insulator means being disposed on said first electrode means;
   first means for emitting light, said first light emitting means being disposed on a surface of said first insulator means and in optical alignment with said filter means;
   second electrode means for providing a second selecting potential to said device, said second electrode means being disposed adjacent said first light emitting means; and
   second insulating means for insulating said first light emitting means from said second electrode means, said second insulating means being disposed between said first light emitting means and said second electrode means.

2. The device of claim 1 wherein said substrate comprises a glass.

3. The device of claim 1 wherein said filter means comprises a red filter.

4. The device of claim 3 wherein said red filter comprises cadmium sulfoselenide.

5. The device of claim 4 wherein said cadmium sulfoselenide comprises the chemical composition $CdS_xSe_{1-x}$ where x is in the range of 0.80 to 0.40.

6. The device of claim 5 wherein said cadmium sulfoselenide thickness is between 0.8 and 1.5 micrometers.

7. The device of claim 4 wherein said cadmium sulfoselenide comprises the chemical composition $CdS_{.62}Se_{.38}$.

8. The device of claim 3 wherein said red filter comprises zinc selenium telluride.

9. The device of claim 1 wherein said first electrode means comprises indium tin oxide.

10. The device of claim 1 wherein said first light emitting means comprises a zinc sulphide doped with manganese.

11. The device of claim 1 further comprising second means for emitting light, said second light emitting means being disposed adjacent said first light emitting means between said first and second insulating means.

12. The device of claim 11 wherein said second light emitting means comprises zinc sulfide doped with terbium fluoride.

13. The device of claim 11 further comprising third means for emitting light, said third light emitting means being disposed adjacent said second light emitting means between said first and second insulating means.

14. The device of claim 13 wherein said third light emitting means comprises strontium sulphide doped with cerium fluoride.

15. This device of claim 13 wherein said third light emitting means comprises zinc sulphide doped with thulium.

16. The device of claim 1 wherein said second electrode means comprises aluminum.

17. The device of claim 1 wherein said first and second electrode means are perpendicular to one another.

18. The device of claim 1 wherein said first and second insulating means comprise silicon oxynitride.

19. A multi-colored thin-film electroluminescent device comprising:
   a substrate;
   filter means for filtering light formed in a first portion of a surface of said substrate;
   first electrode means for providing a first selecting potential to said device, said first electrode means being disposed on an exposed portion of said surface of said substrate and also overlaying said filter means;
   first insulator means for insulating said first electrode means, said first insulator means being disposed on said first electrode means;
   first means for emitting light, said first light emitting means being disposed on a surface of said first insulator means and in an overlaying relation with said filter means;
   second electrode means for providing a second selecting potential to said device, said second electrode means being disposed adjacent said first light emitting means; and
   second insulating means for insulating said first light emitting means from said second electrode means, said second insulating means being disposed between said first light emitting means and said second electrode means.

20. The device of claim 19 wherein said substrate comprises a glass.

21. The device of claim 19 wherein said filter means comprises a red filter.

22. The device of claim 21 wherein said red filter comprises cadmium sulfoselenide.

23. The device of claim 22 wherein said cadmium sulfoselenide comprises the chemical composition $CdS_xSe_{1-x}$ where x is in the range of 0.80 to 0.40.

24. The device of claim 23 wherein said cadmium sulfoselenide thickness is between 0.8 and 1.5 micrometers.

25. The device of claim 22 wherein said cadmium sulfoselenide comprises the chemical composition $Cds_{.62}Se_{.38}$.

26. The device of claim 21 wherein said red filter comprises zinc selenium telluride.

27. The device of claim 19 wherein said first electrode means comprises indium tin oxide.

28. The device of claim 19 wherein said first light emitting means comprises a zinc sulphide doped with manganese.

29. The device of claim 19 further comprising second means for emitting light, said second light emitting means being disposed adjacent said first light emitting means between said first and second insulating means.

30. The device of claim 29 wherein said second light emitting means comprising zinc sulfide doped with terbium fluoride.

31. The device of claim 29 further comprising third means for emitting light, said third light emitting means being disposed adjacent said second light emitting means between said first and second insulating means.

32. The device of claim 31 wherein said third light emitting means comprises strontium sulphide doped with cerium fluoride.

33. The device of claim 31 wherein said third light emitting means comprises zinc sulfide doped with thulium.

34. The device of claim 19 wherein said second electrode means comprises aluminum.

35. The device of claim 19 wherein said first and second electrode means are orthogonal to one another.

36. The device of claim 19 wherein said first and second insulating means comprise silicon oxynitride.

37. A multi-colored thin-film electroluminescent device comprising:
   a substrate;
   a cadmium sulfoselenide filter disposed on a first portion of a surface of said substrate;
   a first plurality of electrodes being disposed on said surface of said substrate and in an overlaying and orthogonal relation with said cadmium sulfoselenide filter;
   a first insulator being disposed on said first plurality of electrodes;
   means for emitting light of a first color, said first color light means being disposed on a surface of said first insulator and in an overlaying relation with said cadmium sulfoselenide filter;
   means for emitting light of a second color, said second color light means being disposed on said surface of said insulator adjacent said first color light means;
   a second plurality of electrodes being disposed adjacent said first and second color light means and being orthogonal to said first plurality of electrodes; and
   a second insulator being disposed between said first and second color light emitting means and said second plurality of electrode 38. The device of claim 37 wherein said cadmium sulfoselenide filter comprises the chemical composition $CdS_xSe_{1-x}$ where x is in the range of 0.80 to 0.40.

39. The device of claim 38 wherein said cadmium sulfoselenide thickness is between 0.8 and 1.5 micrometers.

40. The device of claim 38 wherein said cadmium sulfoselenide filter comprises the chemical composition $CdS_{.70}Se_{.30}$.

41. A multi-colored thin-film electroluminescent device comprising a transparent base having on a surface thereof a filter comprised of a layer of cadmium sulfoselenide deposited in the form of a film that is in optical alignment with a light emitting layer of said electroluminescent device.

42. The device of claim 41 wherein said cadmium sulfoselenide filter comprises the chemical composition $CdS_xSe_{1-x}$ where x is in the range of 0.80 to 0.40.

43. The device of claim 42 wherein said cadmium sulfoselenide thickness is between 0.8 and 1.5 micrometers.

44. The device of claim 41 wherein said cadmium sulfoselenide filter comprises the chemical composition $CdS_{.62}Se_{.38}$.

45. A multi-colored thin-film electroluminescent device comprising a transparent base having on a surface thereof a filter comprised of a layer of cadmium sulfoselenide deposited in the form of a film that is in optical alignment with a first light emitting material, there being at least one other light emitting material that is adjacent said first light emitting material and supported on said base which is not in optical alignment with said filter.

46. The device of claim 45 wherein there are two other light emitting materials producing light having different colors which are not in an optical alignment with said filter.

* * * * *